United States Patent Office 2,897,181
Patented July 28, 1959

2,897,181
PRODUCTION OF POLYURETHANES

Erwin Windemuth, Leverkusen-Bayerwerk, Germany, assignor to Farbenfabriken Bayer Aktiengesellschaft, Leverkusen, Germany, a corporation of Germany No Drawing. Application October 6, 1954
Serial No. 460,761

Claims priority, application Germany October 7, 1953

3 Claims. (Cl. 260—75)

The present invention relates to a new process of producing polyurethanes from organic compounds containing hydroxyl groups and isocyanates.

In the production of urethanes from mono- or polyisocyanates and organic compounds containing hydroxyl groups such as mono- or polyfunctional alcohols, polyesters, polyester amides, polyglycol ethers and low molecular weight polyurethanes, side reactions are frequently observed. The interference of these side reactions is especially detrimental in the production of urethanes of high molecular weight by the diisocyanate-poly addition process. For instance in reacting polyesters or polyester amides with diisocyanates to effect chain-lengthening of the polyester or polyester amide groups, cross-linked insoluble end products sometimes result instead of the desired linear compounds. This undesired cross-linking reaction occurs very readily when soluble products containing isocyanate end groups are produced and the detrimental effect of this side reaction increases as the molecular weight of the desired product increases. Also, in the production of polyaddition products from organic compounds containing hydroxyl groups and an organic diisocyanate in an amount insufficient to react with the hydroxyl groups present, side reactions frequently lead to the formation of products other than those expected from the reaction mechanism.

Various explanations may be given as to the nature of the above-mentioned side reactions but the actual cause therefor cannot be stated with certainty. This is due to the nature of the isocyanate group, the high reactivity of which is such that it is hardly equalled by any other atomic grouping. Side reactions which possibly occur in the reaction of compounds containing hydroxyl groups with isocyanates are for instance dimerization and/or polymerization of the isocyanates with one another. Such dimerization and/or polymerization are caused by the weakly basic reacting urethane groups formed during the reaction, and also by the reaction of the isocyanate groups with the hydrogen atoms of the urethane carbonamide or urea groups which are present or formed in the molecule of the compound containing hydroxyl groups during the isocyanate reaction.

In accordance with the present invention, it has now been found that the above-described undesired side reactions can be avoided without slowing down the rate of the urethane formation, if the reaction between the compound containing hydroxyl groups and the isocyanate is carried out in an acid medium in the presence of a heavy metal compound which is soluble in at least one of the reactants. The reaction in an acid medium in the presence of a metal compound according to the process of the present invention effects a controlled course of reaction and makes possible the production of compounds which could not be obtained by previously known methods. By subjecting, for instance linear polyesters containing hydroxyl groups and p-phenylene diisocyanate, naphthalene-1,5-diisocyanate or 4,4'-diphenylmethane diisocyanate to the herein described process, high molecular weight soluble addition products can be obtained which contain either hydroxyl or isocyanate end groups depending upon the quantity of the diisocyanate employed. The reaction of these components, when carried out in the absence of the controlling acid reacting and metal compounds under otherwise similar conditions, leads to the formation of branched or cross-linked insoluble products due to side reactions taking place.

In carrying out the process of the invention, an acid medium may be provided by adding to the reaction mixture an anhydrous acid. Thus, to the reaction mixture there may be added a hydrogen halide or a compound capable of splitting off hydrogen halide, as for example acid halides. Other suitable anhydrous acids which may be employed in the practice of the invention include organic mono- or polycarboxylic acid, sulfonic acids such as benzene sulfonic acid, p-toluylene sulfonic acid, naphthol sulfonic acids or its halides; furthermore, compounds may be employed which are capable of splitting off acid reacting substances at elevated temperatures, for instance butadiene sulfone.

In order to provide an acid reaction medium, aqueous acids may likewise be employed. Since water would react with the isocyanate component, it is preferable to prepare the compound containing hydroxyl groups in the presence of an aqueous acid in order to impart to same an acid reaction rather than to introduce an aqueous acid into the mixture containing the isocyanate. Thus, a polyester containing hydroxyl groups may be prepared from polycarboxylic acids and polyhydric alcohols in the presence of an aqueous acid, the water content of which is subsequently removed along with the reaction water by distillation. Obviously, acids which would cause undesired side reactions (oxidation, carbonization), such as nitric acid and sulfuric acid, are inoperative.

Heavy metal compounds which are suitable for the process of the invention are compounds which are soluble in at least one of the reaction components or in the final reaction product and exert an accelerating effect on the reaction of an isocyanate group with a hydroxyl group. Examples of particularly suitable metal compounds according to the invention are ferric chloride, ferric acetyl acetonate, iron penta carbonyl, iron acetoacetic ester and iron cyclopentanone carboxylic acid ester etc.; and also compounds of the following metals, which have an analogous or similar structure: nickel, cobalt, zinc, lead, aluminum, manganese and magnesium.

In general, the above additives will be employed in small quantities. The acid reacting component is preferably added in an amount sufficient to yield an acid reaction mixture. Generally quantities of less than 1/10% based on the component containing hydroxyl groups are sufficient to obtain the desired result, but it may be necessary to employ this component in larger or smaller quantities depending upon the reactivity of the isocyanates employed, the reaction temperature and the composition of the component containing hydroxyl groups. The amount of the metal compound used as activator depends upon the acidity of the reaction mixture and also upon the factors mentioned with respect to the acid reacting compounds. The quantity of the metal compound has to be determined for every specific case and carefully adjusted in proper relation to the amount of the acid reacting component. At any rate, however, the quantity of the metal compound must be such that the reaction proceeding under the above described conditions is characterized by an increase in the viscosity of the polymer and a marked evolution of heat. Otherwise, only partial reaction of the components occurs or the components are not reacted at all.

The invention is further illustrated by the following examples without being restricted thereto, the parts being by weight.

Example 1

To 600 parts of a linear polyester containing hydroxyl groups, which has been prepared from 10 mols of adipic acid, 8.8 mols of ethylene glycol and 1.9 mols of diethylene glycol and has an average molecular weight of 2300, there are added at 90° C., after azeotropic dehydration with benzene, 0.360 part of terephthalic acid chloride and 0.084 part of ferric acetyl acetonate and, shortly after that, 43.8 parts of p-phenylene diisocyanate. After homogenizing the components by stirring for 10 minutes, the reaction mixture is placed in a separate container and heated to 120° C. for 10 hours. At the end of this time a condensation product which is soluble in acetone and ethyl acetate is obtained. The product contains free isocyanate groups, can be made into a sheet on a set of mixing rollers and shows all the properties of a linear, high molecular weight thermoplastic in conformity with the molecular weight of 50,000 which was to be expected.

If the above reaction is carried out without the addition of the controlling compounds, i.e. terephthalic acid chloride and ferric acetyl acetonate, a condensation product results which is insoluble in acetone and ethyl acetate and shows the typical characteristics of a cross-linked rubber-elastic plastic.

In the table below the results of comparative showings are given with respect to products prepared according to this example from linear polyesters containing hydroxyl groups and p-phenylene diisocyanate in the presence of terephthalic acid chloride and ferric acetyl acetonate as controlling compounds, and with respect to products prepared under the same conditions but without the addition of said controlling compounds. The reactants are subjected to the reaction conditions described in Example 1, but 0.360 part of terephthalic acid chloride and 0.126 part of ferric acetyl acetonate are employed per 600 parts of the polyester containing hydroxyl groups. The results of the comparative showings are compiled in the following table:

| Parts p-phenylene diisocyanate per 600 parts of polyester | controlling compounds | $\eta \times 1,000$ conc. g./l. in m-cresol at 25° C. | calculated molecular weight |
| --- | --- | --- | --- |
| 39.6 | no | 109 | 47,840 |
|  | yes | 131 |  |
| 40.8 | no | 154 | 109,172 |
|  | yes | 166 |  |

The viscosity numbers $z\eta$ in the third column of the table show a lower value for the products prepared in the absence of controlling compounds than for the products prepared in the presence of controlling compounds. This is due to branching resulting from secondary reactions which prevent part of the diisocyanate from taking part in the synthesis of the desired linear compound in contrast to the condensation reaction carried out in the presence of the above controlling compounds.

Example 2

To 600 parts of the polyester obtained as described in Example 1, there are added at 120° C., 0.360 part of terephthalic acid chloride, 0.084 part of ferric acetyl acetonate and 57.54 parts of naphthalene-1,5-diisocyanate as described in the preceding example. After homogenizing the components the mixture is heated to 120° C. for 10 hours. A condensation product containing free isocyanate groups, which is soluble in acetone and ethyl acetate and can be made into a sheet on a set of mixing rollers, is obtained. The specific viscosity of a 0.1% solution in m-cresol at 25° C. is 0.134. If the reaction is carried out with 56.16 parts of naphthalene-1,5-diisocyanate a similar product results, which is characterized by a specific viscosity of 0.185.

In both instances cross-linked insoluble condensation products are obtained if the reaction is carried out in the absence of the controlling compounds.

Example 3

To 600 parts of the polyester obtained as described in Example 1, there are added at 80° C., after azeotropic dehydration with benzene, 0.36 part of terephthalic acid chloride, 0.18 part of ferric acetyl acetonate and 46.8 parts of a mixture of 70% of 2,4-toluylene diisocyanate and 30% of 2,6-toluylene diisocyanate. After homogenizing the components, the mixture is heated in a separate container with the exclusion of atmospheric air to 120° C. for 10 hours. A thermoplastic condensation product is obtained, which is soluble in acetone and ethyl acetate and contains free isocyanate groups. The specific viscosity of the product, measured by a 0.1% solution of m-cresol at 25° C., is 0.185.

By subjecting the polyester and the diisocyanate mixture to the above reaction conditions without the addition of the above controlling compounds, i.e. terephthalic acid chloride and ferric acetyl acetonate, a cross-linked plastic which is insoluble in acetone and ethyl acetate is obtained.

Example 4

To 600 parts of the polyester obtained as described in Example 1, there are added at 90° C., after azeotropic dehydration with benzene, 0.36 part of terephthalic acid chloride, 0.2 part of zinc acetyl acetonate and 43.2 parts of p-phenylene diisocyanate. After intimately mixing the components, the reaction mixture is removed from the reaction vessel, placed in a separate container and heated to 120° C. for 10 hours. A condensation product is thus obtained, which is soluble in acetone and ethyl acetate, contains free isocyanate groups and can be made into a sheet on a set of mixing rollers. The specific viscosity of the condensation product, measured by a 0.1% solution of m-cresol at 25° C., is 0.169. By carrying out the above reaction with the polyester but with other quantities of the diisocyanate, viz. 42.6 parts or 42.0 parts of p-phenylene diisocyanate, similar products are obtained, which are only distinguished from the products obtained by the first reaction by their higher molecular weight and higher specific viscosities, i.e. viscosities of 0.216 or 0.266 respectively.

In the above three instances, cross-linked products which are insoluble in organic solvents and have the character of vulcanized rubber are obtained if the reaction is carried out without the addition of controlling compounds.

Example 5

To 600 parts of the polyester obtained as described in Example 1, there are added at 80° C., 0.36 part of terephthalic acid chloride, 0.18 part of ferric acetyl acetonate and 67.2 parts of 4,4'-diphenylmethane diisocyanate. After intimately mixing the components, the mixture is heated in a separate container at 120° C. for 10 hours. A condensation product containing isocyanate groups, which is soluble in acetone and ethyl acetate and has a specific viscosity of 0.088 at 25° C. measured by a 0.1% solution in m-cresol, is obtained. In the absence of the controlling compounds but under otherwise similar conditions, a cross-linked condensation product results, which is insoluble in organic solvents and shows the character of a vulcanized rubber.

Example 6

To 600 parts of the polyester obtained as described in Example 1, there are added at 90° C., 0.6 part of terephthalic acid chloride, 0.18 part of cobalt acetyl acetonate and 43.2 parts of p-phenylene diisocyanate. By heating the reaction mixture at 120° C. for 10 hours a product containing isocyanate groups is obtained, which is soluble in acetone and ethyl acetate and has a specific viscosity of 0.171 at 25° C. measured by a 0.1% solution in m-cresol. In the absence of the controlling compounds, an insoluble, cross-linked condensation product of the character of a vulcanized rubber is obtained.

*Example 7*

To 600 parts of an adipic acid glycol polyester containing hydroxyl end groups and having an average molecular weight of 2540, there are added at 90° C., after azeotropic dehydration with benzene, 0.3 part of terephthalic acid chloride, 0.3 part of nickel acetyl acetonate and 41.4 parts of p-phenylene diisocyanate. After heating the reaction mixture at 120° C. for 10 hours, a condensation product containing isocyanate groups is obtained which is soluble in acetone and ethyl acetate and has a specific viscosity of 0.215 at 25° C. measured by a 0.1% solution in m-cresol. The product shows the deformation value 1400 at 80° C. and an elastic proportion of 37.

If the above reaction is carried out in the absence of the controlling compounds, a condensation product containing isocyanate groups is obatined, which is also soluble and shows a specific viscosity of 0.188 and a deformation value of 1400 at 80° C. with an elastic proportion of 48.2. The lower specific viscosity of this product and the higher elastic proportion of the deformation value are signs of side reactions occurring in the process, which side reactions cause branching in the condensation product. This proves again the unequivocal effect of the controlling compounds of the present invention in bringing about the production of a polymer of substantially linear chains.

The compounds containing hydroxyl groups, which are referred to in the foregoing examples, are exclusively moderately high molecular weight polyesters containing hydroxyl end groups. It is to be understood, however, that the process of the invention is by no means restricted to this type of polyesters. As a matter of fact, other compounds containing hydroxyl groups may also be subjected to the herein described process of producing polyurethanes. For instance pure polyurethanes are obtainable by the process of the invention from glycols of the most varied type, including polyethylene glycols and polypropylene glycols of high molecular weight, and diisocyanates. The properties of these polyurethanes are distinguished from the products prepared without the addition of the controlling compounds. Also polyfunctional compounds containing hydroxyl groups for instance glycerol, trimethylol propane, hexanetriol, castor oil, pentaerythritol, sorbite, mannite, their alkylene oxide condensation products or their partial esterification products with mono-, poly-, or hydroxy carboxylic acids, and polyisocyanates may successfully be employed in the herein described process.

The diisocyanates referred to in the examples are all of aromatic nature. It is to be understood, however, that also aliphatic, cycloaliphatic or aliphatic-aromatic diisocyanates, which react at a markedly slower velocity, as well as diisocyanates containing in the molecule more than two isocyanate groups are useful components according to the invention.

The process of producing polyurethanes with the addition of controlling compounds according to the invention may also be carried out in the presence of inert solvents. The method of adding the controlling compounds to the reaction mixture is of no importance provided that they are present at the instant the reaction of the isocyanate groups with the hydroxyl groups of one or more reactants starts. This means that for instance the acid reacting components may be added with the isocyanate, for instance in the form of an addition product of a hydrogen halide to the hydroxyl compounds containing soluble metallic compounds, or vice versa, the isocyanate component, which is activated by a metallic compound, can be reacted with the hydroxyl compounds containing for instance carboxylic anhydrides.

I claim:

1. A process for the preparation of a high molecular weight linear non-porous polyurethane which comprises reacting a hydroxyl-terminated polyester prepared by the esterification of adipic acid with a substantial excess of ethylene glycol with an organic diisocyanate in an acid reaction medium and in the presence of a heavy metal compound selected from the group consisting of ferric chloride, ferric acetyl acetonate, iron pentacarbonyl, iron acetoacetic ester, iron cyclopentanone carboxylic acid ester and the corresponding compounds of nickel, cobalt, zinc, lead, aluminum, manganese, and magnesium, the acidity of the reaction medium being provided by a substantial amount, up to about .1% by weight based on the polyester, of terephthalic acid chloride.

2. Process of claim 1 wherein the heavy metal compound is ferric acetyl acetonate.

3. Process of claim 1 wherein the polyisocyanate is toluylene diisocyanate.

References Cited in the file of this patent

UNITED STATES PATENTS

| | | |
|---|---|---|
| 2,430,479 | Pratt et al. | Nov. 11, 1947 |
| 2,729,618 | Muller et al. | Jan. 3, 1956 |

FOREIGN PATENTS

| | | |
|---|---|---|
| 860,109 | Germany | Dec. 18, 1952 |
| 919,071 | Germany | Oct. 11, 1954 |

OTHER REFERENCES

Petersen: Liebigs Annalen der chemie, 562 page 206 (1949) (copy in Sci. Library).

The Van Nostrand Chemist's Dictionary, D. Van Nostrand Co., Inc., N.Y., 1953, pages 367-8 (copy in Sci. Library).